(12) United States Patent
Okamoto et al.

(10) Patent No.: US 8,651,575 B2
(45) Date of Patent: Feb. 18, 2014

(54) SEAT BACK STRUCTURE WITH LUMBAR SUPPORT FOR VEHICLE

(75) Inventors: Masafumi Okamoto, Fuchu-cho (JP); Ryota Okimoto, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 64 days.

(21) Appl. No.: 13/403,216

(22) Filed: Feb. 23, 2012

(65) Prior Publication Data

US 2012/0217778 A1 Aug. 30, 2012

(30) Foreign Application Priority Data

Feb. 28, 2011 (JP) ................................. 2011-041248

(51) Int. Cl.
*A47C 7/40* (2006.01)
*A47C 7/44* (2006.01)

(52) U.S. Cl.
USPC ........................................................ 297/284.4

(58) Field of Classification Search
USPC ..................................................... 297/284.4
See application file for complete search history.

(56) References Cited

U.S. PATENT DOCUMENTS

| | | | | |
|---|---|---|---|---|
| 3,807,794 A | * | 4/1974 | Beyer ........................... | 297/284.4 |
| 3,973,797 A | * | 8/1976 | Obermeier et al. ........ | 297/284.4 |
| 4,550,949 A | * | 11/1985 | Sakamoto ................... | 297/284.1 |
| 4,564,235 A | * | 1/1986 | Hatsutta et al. ............. | 297/284.4 |
| 4,725,095 A | * | 2/1988 | Benson et al. .............. | 297/284.1 |
| 4,886,316 A | * | 12/1989 | Suzuyama et al. ......... | 297/284.4 |
| 5,087,098 A | * | 2/1992 | Ishizuka ...................... | 297/284.4 |
| 5,286,087 A | * | 2/1994 | Elton .......................... | 297/284.8 |
| 5,302,002 A | * | 4/1994 | Nagasaka ................... | 297/284.4 |
| 5,403,069 A | * | 4/1995 | Inara et al. ................. | 297/284.4 |
| 5,588,703 A | * | 12/1996 | Itou ............................. | 297/284.4 |
| 5,651,584 A | * | 7/1997 | Chenot et al. .............. | 297/284.4 |
| 2010/0187874 A1 | | 7/2010 | Matsui | |

FOREIGN PATENT DOCUMENTS

| | | |
|---|---|---|
| JP | 4-107651 | 9/1992 |
| JP | 7-19562 | 4/1995 |
| JP | 7-291005 | 11/1995 |

\* cited by examiner

*Primary Examiner* — Rodney B White
(74) *Attorney, Agent, or Firm* — Gerald E. Hespos; Michael J. Porco; Matthew T. Hespos (57) ABSTRACT

A lumbar support plate which is supported movably in a front/rear direction in a back frame that supports a headrest, and a biasing member which supports the lumbar support plate, are provided. A clutch mechanism which enables an output member to rotate by a rotating operation of a handle shaft, and an adjustment member which is capable of adjusting the front/rear position of the lumbar support plate in relation with an output member of the clutch mechanism are also provided. Also provided is a linking release mechanism which temporarily releases linkage with the clutch mechanism and permits rearward movement of the lumbar support plate, when a load equal to or greater than a prescribed value is applied to the lumbar support plate.

10 Claims, 9 Drawing Sheets

FIG.9B
PRIOR ART ately with the pinion 3 (see, for example, Japanese Util-
SEAT BACK STRUCTURE WITH LUMBAR SUPPORT FOR VEHICLE

BACKGROUND OF THE INVENTION

1. Field of the Invention

The present invention relates to a structure of a seat back with lumbar support for a vehicle.

2. Description of the Related Art

In a vehicle, and in particular an automobile, a headrest is provided in the upper part of a seat back as a countermeasure against neck injury (whiplash) in a vehicle occupant in the event of a rear collision. However, a headrest alone is not sufficient as a countermeasure against neck injuries.

Therefore, it has been proposed to provide a coupling member which extends rearwards only when a load equal to or exceeding a prescribed value is applied, in the coupling portion of a seat back frame with an S spring (a cushion spring which is bent in a continuous plurality of S shapes) (see, for example, Japanese Patent Application Laid-open No. H7-291005).

When the weight of a vehicle occupant acts on an S spring as a reaction to a rear impact, the coupling member extends rearwards, the occupant's back sinks into the seat back, and hence the occupant's head is received and held by the headrest.

On the other hand, there have also been proposed to provide a lumbar support plate for supporting an occupant's lumbar region, inside a seat back (see, for example, Japanese Utility Model Application Laid-open No. H4-107651).

Figure 7:
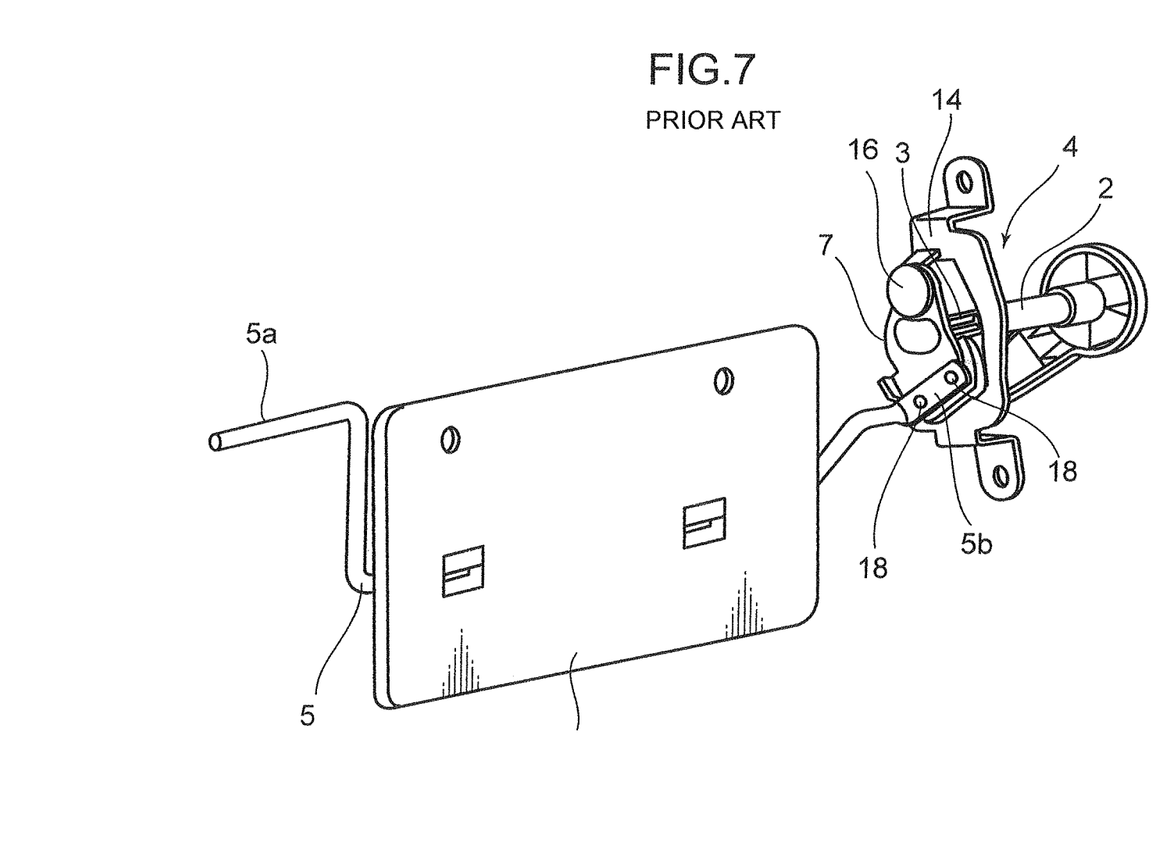
FIG. 7 is a perspective diagram of a lumbar support plate, a torsion bar and a clutch mechanism (brake mechanism) according to the related art.
Figure 8:
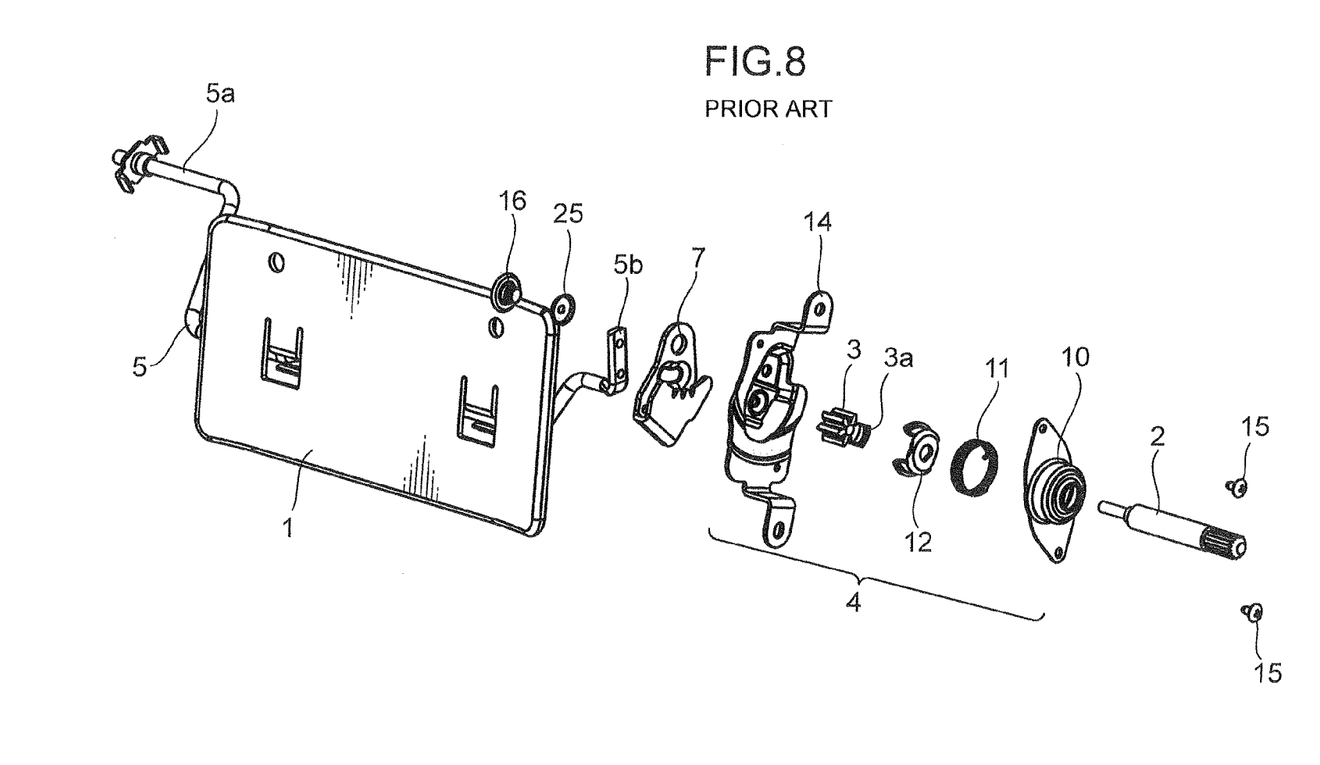
FIG. 8 is an exploded perspective diagram of a lumbar support plate, a torsion bar and a clutch mechanism (brake mechanism) according to the related art.

More specifically, as shown in FIG. 7 and FIG. 8, a lumbar support plate 1 which is supported movably in the front/rear direction is provided inside a back frame of a seat back (see reference numeral 20 in FIG. 1).

A clutch mechanism 4 which is capable of rotating a pinion 3, which forms an output member, by means of a rotating operation of a handle shaft 2, is provided in one side frame of the back frame (see reference numeral 20b in FIG. 1). Furthermore, a torsion bar 5 is provided as a biasing member which biases the lumbar support plate 1 forwards, one end portion 5a of the torsion bar being supported by the other side frame of the back frame (see reference numeral 20c in FIG. 1) and the other end portion 5b of the torsion bar being fixed to a fan-shaped gear (turning member) 7 which is turned by the pinion 3 of the clutch mechanism 4.

As a member for adjusting the front/rear position of the lumbar support plate 1, the front/rear position of the other end portion 5b of the torsion bar 5 is adjusted by turning the fan-shaped gear 7 in relation with the rotation of the pinion 3 of the clutch mechanism 4.

Figure 9A:
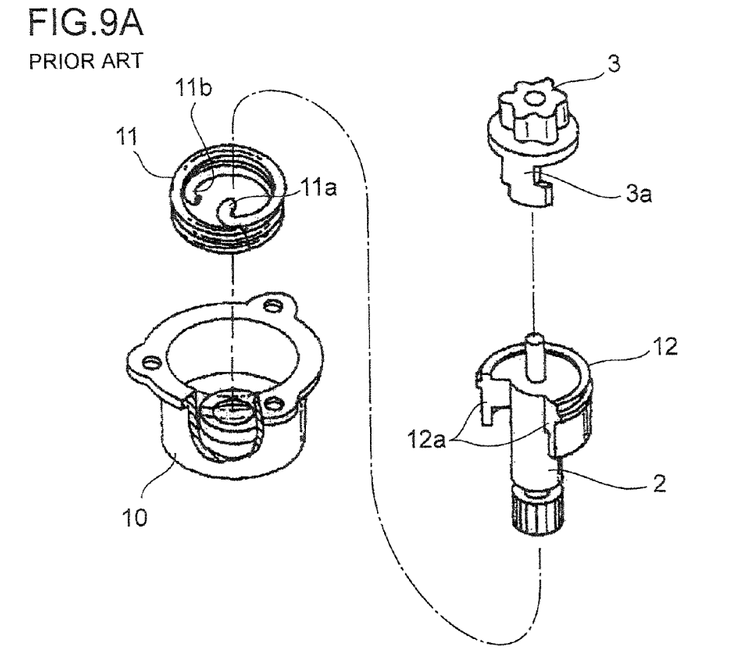
FIG. 9A is an exploded perspective diagram.

As shown in FIG. 9A, the clutch mechanism 4 (also called a brake mechanism) comprises a brake drum 10, a brake spring 11 which makes pressure contact with the inner wall of the brake drum 10, a core 12 which is formed integrally with the handle shaft 2, and a hook section 3a which is formed integrally with the pinion 3 (see, for example, Japanese Utility Model Application Laid-open No. H7-19562).

Figure 9B:
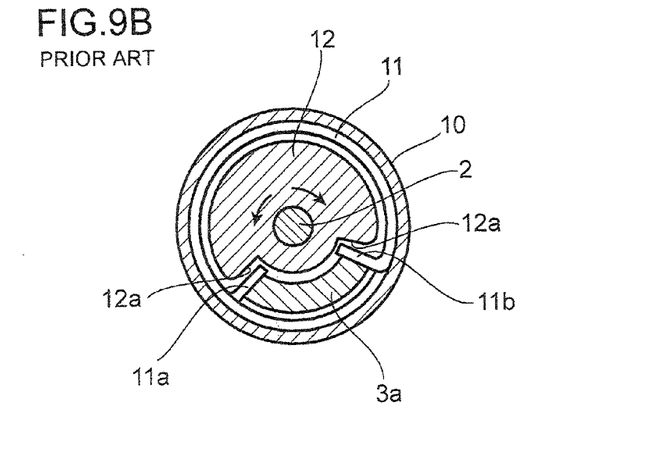
FIG. 9B is a plan view cross-sectional diagram.

As shown in FIG. 9B, the side end portion of the hook section 3a presses a hook section 11a (or 11b) of a brake spring 11 so as to increase the outer diameter of the brake spring 11, against the rotational force from the pinion 3 (the lumbar support plate 1). Consequently, the pressure contact force between the brake spring 11 and the brake drum 10 becomes stronger and rotation of the pinion 3 is impeded (braked state).

Furthermore, in response to a rotational force from the handle shaft 2 side, the hook section 11a (or 11b) of the brake spring 11 receives force in a direction which compresses the outer diameter from the side end portion 12a of the core 12. Therefore, the pressure contact force becomes less, the handle shaft 2 becomes rotatable (brake released state), and the pinion 3 can be rotated via the brake spring 11 and the hook section 3a.

As shown in FIG. 8, in the clutch mechanism 4, the brake spring 11 and the core 12 are incorporated inside a brake drum 10, and the brake drum 10 is fixed by screws 15 to a bracket 14. Furthermore, the handle shaft 2 is coupled to a core 12, and the hook section 3a of the pinion 3 is fitted inside a slot 12a in the core 12 from the outer side of the bracket 14.

The upper portion of the fan-shaped gear 7 which meshes with the pinion 3 is fixed turnably by a pin member 16 via a plate spring 25 to the upper part of the outer surface of the bracket 14, and the other end portion 5b of the torsion bar 5 is fixed by screws 18 to the fan-shaped gear 7.

However, in Japanese Patent Application Laid-open No. H7-291005, an S spring is simply provided in the seat back frame, and this S spring has absolutely no lumbar supporting function. Furthermore, in Japanese Utility Model Application Laid-open No. H4-107651, there is a lumbar supporting function, but no countermeasure against neck injury is provided.

Therefore, in order to provide both a lumbar supporting function and a countermeasure against neck injury, it is necessary to provide both a composition having a lumbar supporting function and a composition having a countermeasure against neck injury, and therefore the number of components increases, costs also rise, and the weight also increases.

SUMMARY OF THE INVENTION

The present invention was devised in order to eliminate the aforementioned problems, an object thereof being to provide a structure of a seat back with lumbar support for a vehicle which avoids increase in both the number of components and weight, by devising a mechanism of a lumbar supporting function so as to serve also as a mechanism providing a countermeasure against neck injury.

In order to resolve the aforementioned problem, the present invention provides a structure of a seat back with lumbar support for a vehicle, comprising:

a seat back (19);

a back frame (20), which is provided inside the seat back (19) and which supports a headrest (21); and a lumbar support plate (1) which is positioned inside a perimeter of the back frame (20) in a width direction of the vehicle and which is supported by the back frame (20) movably in a front/rear direction of the vehicle, the structure further comprising: a linking mechanism which normally holds the lumbar support plate (1) at a prescribed position, in the front/rear direction of the vehicle, with respect to the back frame (20); and a linking release mechanism which permits rearward movement of the lumbar support plate (1) that is in a state of being held at the prescribed position, when a load of a prescribed value or greater is applied to the lumbar support plate (1).

By means of the composition described above, a lumbar supporting function is obtained by the lumbar support plate (1) which is supported inside the seat back (19).

Furthermore, when an occupant load of a prescribed value or greater is applied to the lumbar support plate (1) as a reaction to a rear impact, then rearward movement of the lumbar support plate (1) is permitted by the linking release mechanism. By this means, the occupant's back sinks into the seat back (19) together with the lumbar support plate (1), and therefore the occupant's head is received reliably by the headrest (21) and a countermeasure to neck injuries is obtained.

By devising the lumbar support device having a lumbar support function so as to also include a function of providing a neck injury countermeasure in this way, the number of components is reduced, costs are also lowered, and increase in weight can be avoided.

These and other objects, features and advantages of the present invention will become apparent upon reading of the following detailed description along with the accompanied drawings.

BRIEF DESCRIPTION OF THE DRAWINGS

FIGS. 1A and 1B show an internal frame structure of a frame back of a vehicle seat according to an embodiment of the present invention, in which FIG. 1A is a front view diagram and FIG. 1B is a side view cross-sectional diagram;

FIGS. 3A to 3C show a relationship between a fan-shaped gear according to an embodiment of the present invention and the other end portion of the torsion bar.

FIGS. 4A to 4C show a relationship between the occupant's back and the lumbar support plate according to an embodiment of the present invention.

FIGS. 5A and 5B show an embodiment of the present invention.

FIGS. 9A and 9B show a clutch mechanism (brake mechanism) according to Japanese Utility Model Application Laid-open No. H7-19562.

DESCRIPTION OF THE PREFERRED EMBODIMENT

Hereinbelow, a mode of implementing the present invention is described in detail with reference to the drawings. Parts which have the same composition and action as the prior art are labeled with the same reference numbers and detailed description thereof is omitted here.

Figure 1A:
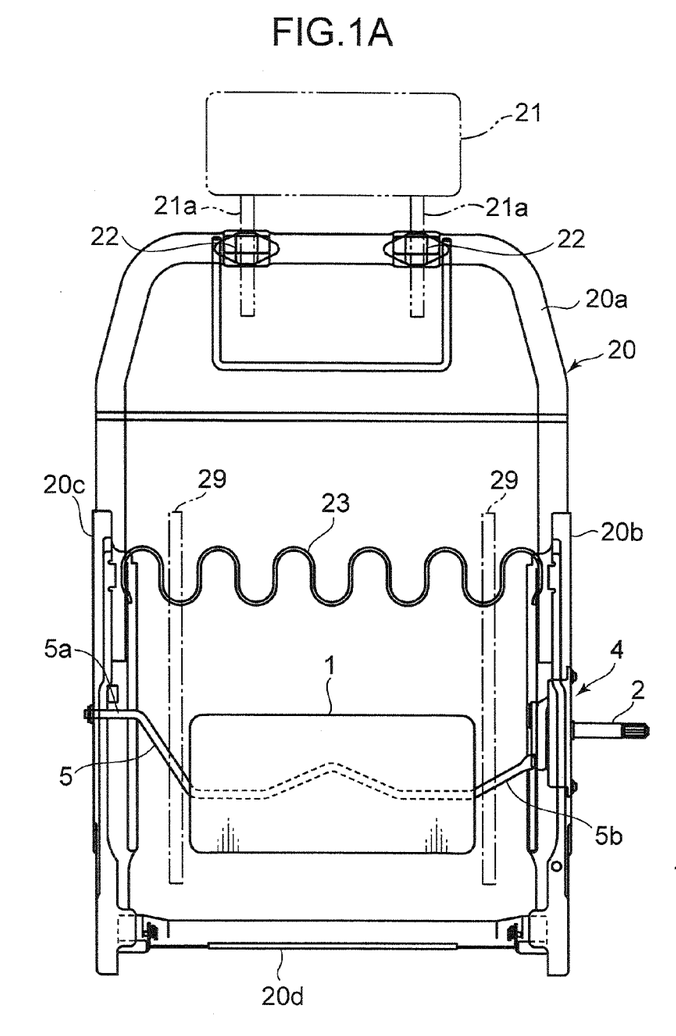
Figure 1B:
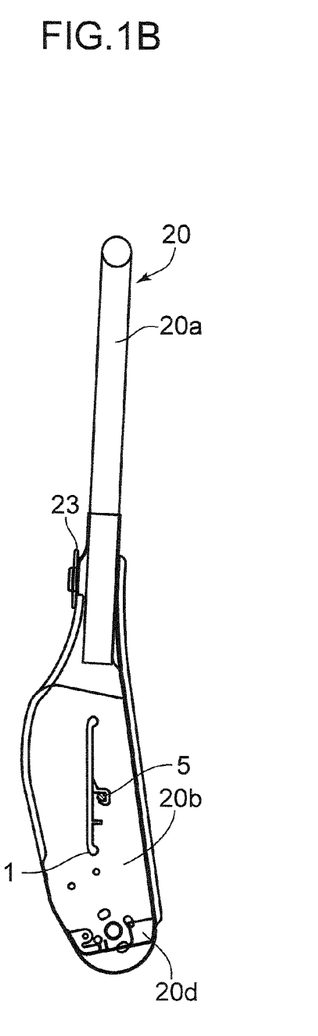
Figure 2:
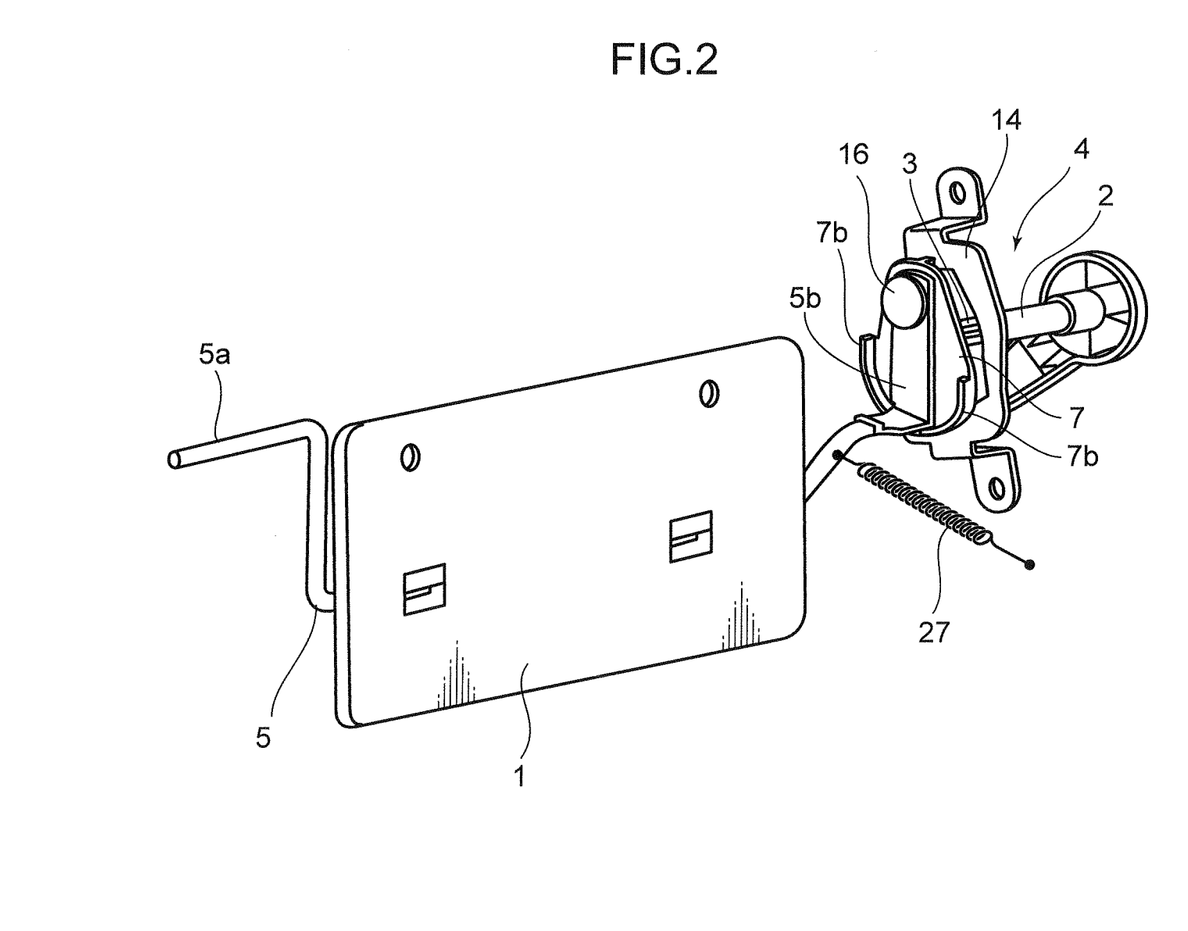
FIG. 2 is a perspective diagram of a lumbar support plate, a torsion bar and a clutch mechanism according to an embodiment of the present invention.

FIG. 1 shows an internal frame structure of a seat back for a vehicle seat, in which FIG. 1A is a front face diagram and FIG. 1B is a side face cross-sectional diagram. FIG. 2 is a perspective diagram of a lumbar support plate, a torsion bar and a clutch mechanism.

The back frame 20 of the seat back is constituted by an inverted U-shaped upper frame 20a, left and right-hand side frames 20b, 20c which are respectively fixed to the left and right-hand portions of the upper frame 20a, and a lower frame 20d which couples the lower portions of the left and right-hand side frames 20b and 20c.

A pole guide 22 which supports poles 21a of a headrest 21 is fixed to the upper frame 20a.

A horizontally long rectangular lumbar support plate 1 which is supported movably in the front/rear direction of the vehicle with respect to the back frame 20 is provided in a lower position within the back frame 20, between the left and right-hand side frames 20b and 20c. Furthermore, an S spring 23 is provided in stretched fashion at an upper position between the left and right side frames 20b and 20c.

A cushion pad is disposed on the upper surface side of the lumbar support plate 1 and the S spring 23, and a seat cushion is composed by covering the over surface portions of these elements with trim.

As shown in FIG. 2, a clutch mechanism 4 which is capable of rotating a pinion 3 (called an output member), by means of a rotating operation of a handle shaft 2, is provided in one side frame 20b of the back frame 20. Furthermore, a torsion bar 5 is provided as a biasing member which biases the lumbar support plate 1 forwards, one end portion 5a of the torsion bar being supported by the other side frame 20c of the back frame 20 and the other end portion 5b of the torsion bar being linked to a fan-shaped gear (turning member) 7 which is turned by the pinion 3 of the clutch mechanism 4. In the related art shown in FIG. 7, the other end portion 5b of the torsion bar 5 is fixed rather than being linked to the fan-shaped gear (turning member) 7 as in the present invention. This linking mechanism and the linking release mechanism are described hereinafter.

Figure 3A:
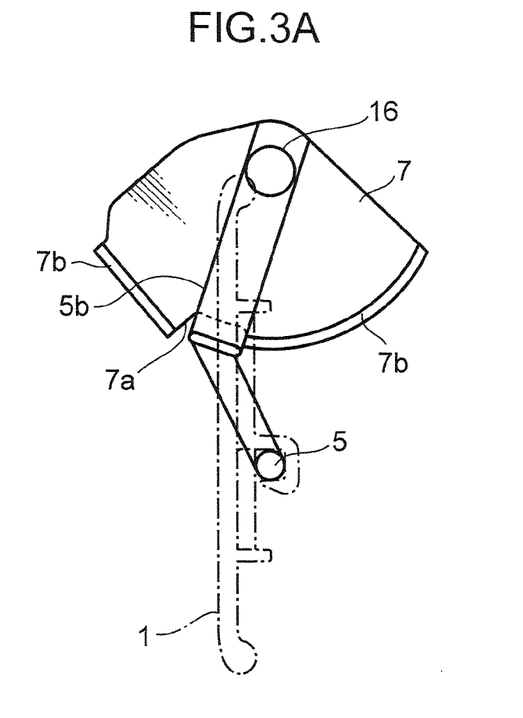
FIG. 3A is a side view diagram of a state where the lumber support plate is set to "strong"
Figure 3B:
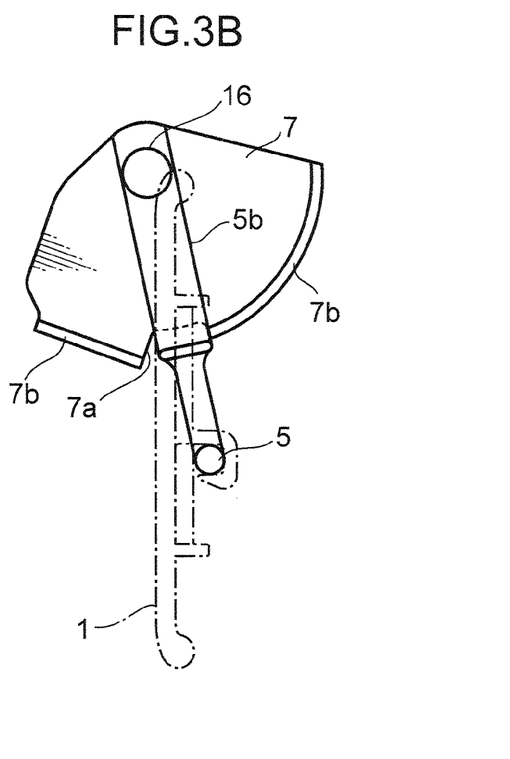
FIG. 3B is a side view diagram of a state where the lumbar support plate is set to "weak"
Figure 4A:
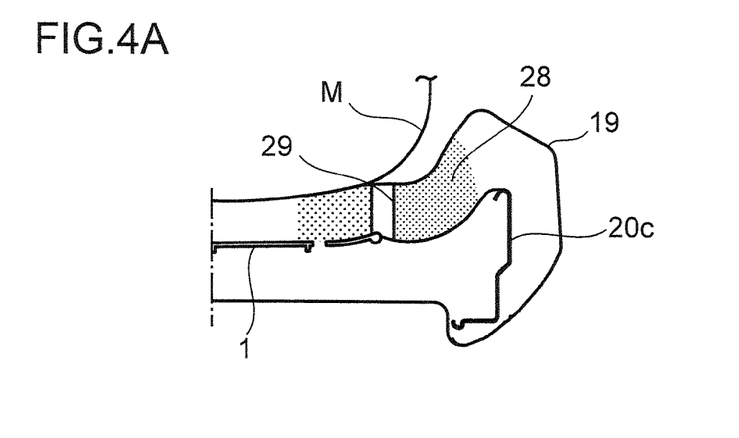
FIG. 4A is a plan view diagram of a state where the lumber support plate is set to "strong"
Figure 4B:
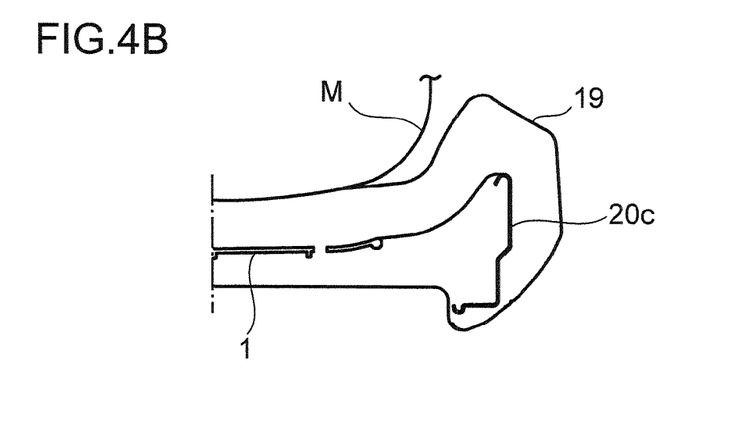
FIG. 4B is a plan view diagram of a state where the lumbar support plate is set to "weak"
Figure 4C:
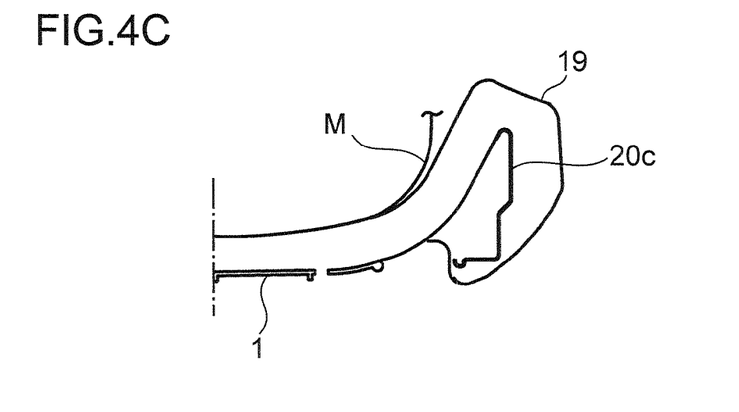
FIG. 4C is a plan view diagram of a state where a load equal to or greater than a prescribed value is applied to the lumbar support plate.

As a member for adjusting the position of the lumbar support plate 1 with respect to the back frame 20 in the front/rear direction of the vehicle, similarly to the related art, the front/rear position of the other end portion 5b of the torsion bar 5 is adjusted by turning the fan-shaped gear 7 in relation with the rotation of the pinion 3 of the clutch mechanism 4. FIG. 3A and FIG. 4A show a state where the lumbar support plate 1 has been set to "strong" (a forward position in the front/rear direction of the vehicle with respect to the back frame 20), and FIG. 3B and FIG. 4B show a state where the lumbar support plate 1 has been set to "weak" (a rear position in the front/rear direction of the vehicle with respect to the position corresponding to the "strong" state). In FIG. 4A to FIG. 4C, reference symbol M indicates the occupant's back.

Furthermore, the clutch mechanism 4 has a similar structure to that of the related art which is illustrated in FIG. 8 and FIG. 9, and the side end portion of the hook section 3a presses a hook section 11a (or 11b) of a brake spring 11 so as to increase the outer diameter of the brake spring 11, against the rotational force from the pinion 3 (the lumbar support plate 1). Consequently, the pressure contact force between the brake spring 11 and the brake drum 10 becomes stronger and rotation of the pinion 3 is impeded (braked state).

Furthermore, in response to a rotational force from the handle shaft 2 side, the hook section 11a (or 11b) of the brake spring 11 receives force in a direction which compresses the outer diameter from the side end portion 12a of the core 12. Therefore, the pressure contact force becomes less, the handle shaft 2 becomes rotatable (brake released state), and the pinion 3 can be rotated via the brake spring 11 and the hook section 3a.

Figure 5A:
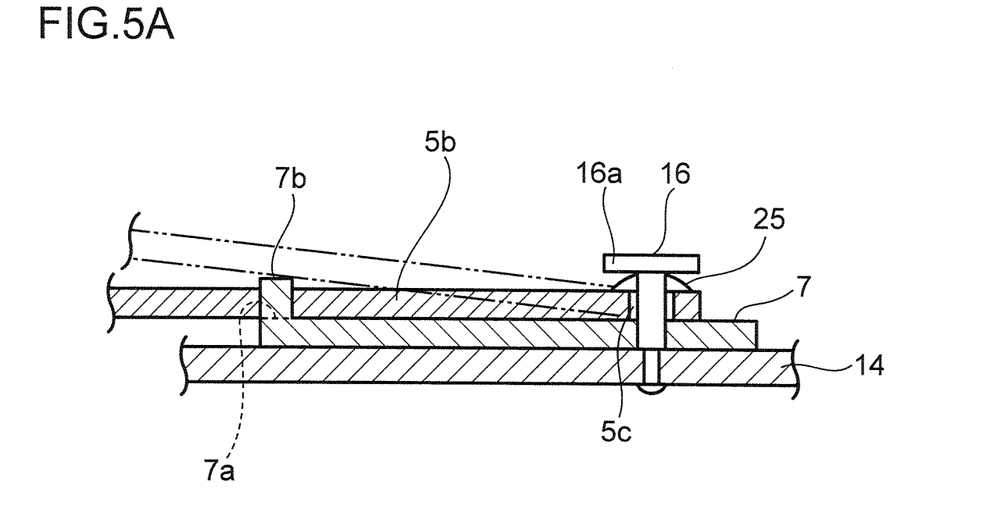
FIG. 5A is a side view cross-sectional diagram of a case where the other end portion of the torsion bar has ridden up onto a projecting section of a fan-shaped gear.

As shown in FIG. 5A, a hole 5c in the other end portion 5b of the torsion bar 5 is fitted rotatably and movably in the axial direction (vehicle width direction) into a pinion member 16 which fixes the upper part of the fan-shaped gear 7 turnably to the bracket 14.

A plate spring (spring member) 25 which biases the other end portion 5b in a direction that contacts the front face of the fan-shaped gear 7 (the upper surface in FIG. 5A) is interposed between the head portion 16a of the pin member 16 and the other end portion 5b of the torsion bar 5.

Figure 5B:
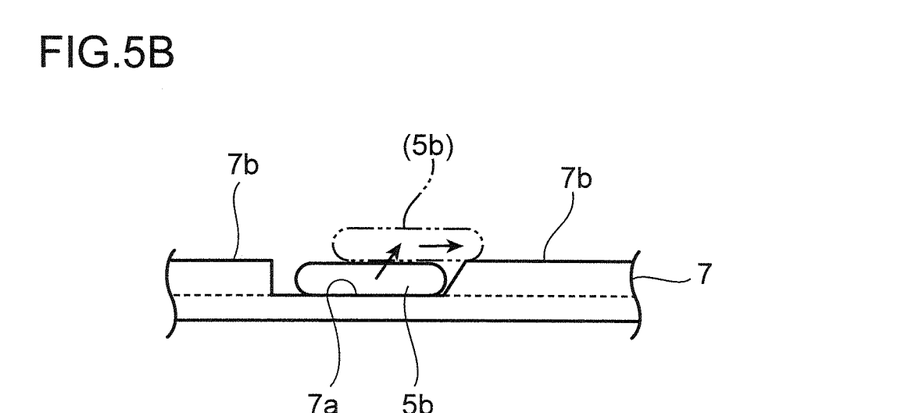
FIG. 5B is a front view diagram of FIG. 5A.

As shown in FIG. 5B, an undulating portion (undulating member) 7a, 7b is provided following the direction of rotation of the other end portion 5b of the torsion bar 5, on the front surface of the fan-shaped gear 7. The other end portion 5b of the torsion bar 5 normally fits inside the recess section 7a and is held at an initial position in contact with the front surface of the fan-shaped gear 7 (the bottom surface of the recess portion 7a).

In this state, the position of the other end portion 5b of the torsion bar 5 in the front/rear direction of the vehicle is adjusted in relation with the turning of the fan-shaped gear 7 (linking mechanism).

Figure 3C:
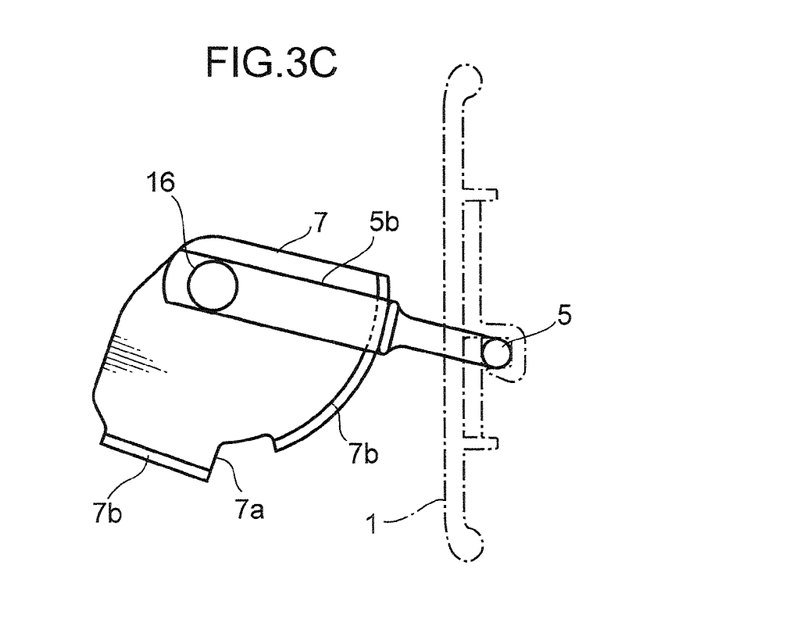
FIG. 3C is a side view diagram of a state where a load equal to or greater than a prescribed value is applied to the lumbar support plate.

If a load of a prescribed value or greater is applied to the lumbar support plate 1, then as shown in FIG. 3C and FIG. 4C, the other end portion 5b of the torsion bar 5 rides up onto the projecting section 7b while moving in the axial direction (the vehicle width direction) away from the fan-shaped gear 7, against the biasing force of the plate spring 25 (see double-dotted broken line in FIG. 5B), thereby temporarily releasing the linking with the clutch mechanism 4 and allowing further rearward movement beyond the region of the recess section 7a of the lumbar support plate 1 (linking release mechanism).

As described above, according to the composition of the seat back having a lumbar support for a vehicle, the front/rear position of the lumbar support plate 1 which is biased forwards by the torsion bar 5 inside the seat back 19 (see FIG. 4) can be adjusted via the clutch mechanism 4 by a rotational operation of the handle shaft 2. By this means, a lumbar supporting function is obtained by the lumbar support plate 1.

Furthermore, if an occupant load equal to or greater than a prescribed value is applied to the lumbar support plate 1 as a reaction to a rear impact, then the other end portion 5b of the torsion bar 5 rides up onto the projecting section 7b while moving in the axial direction (vehicle width direction) away from the fan-shaped gear 7, against the biasing force of the plate spring 25. By this means, further rearward movement is allowed beyond the region of the recess section 7a of the lumbar support plate 1, since the linking with the clutch mechanism 4 is temporarily released.

By this means, as shown in FIG. 4C, the occupant's back sinks into the seat back 19 together with the lumbar support plate 1, and therefore the occupant's head is received reliably by the headrest 21 and a countermeasure to neck injury is obtained.

Figure 6:
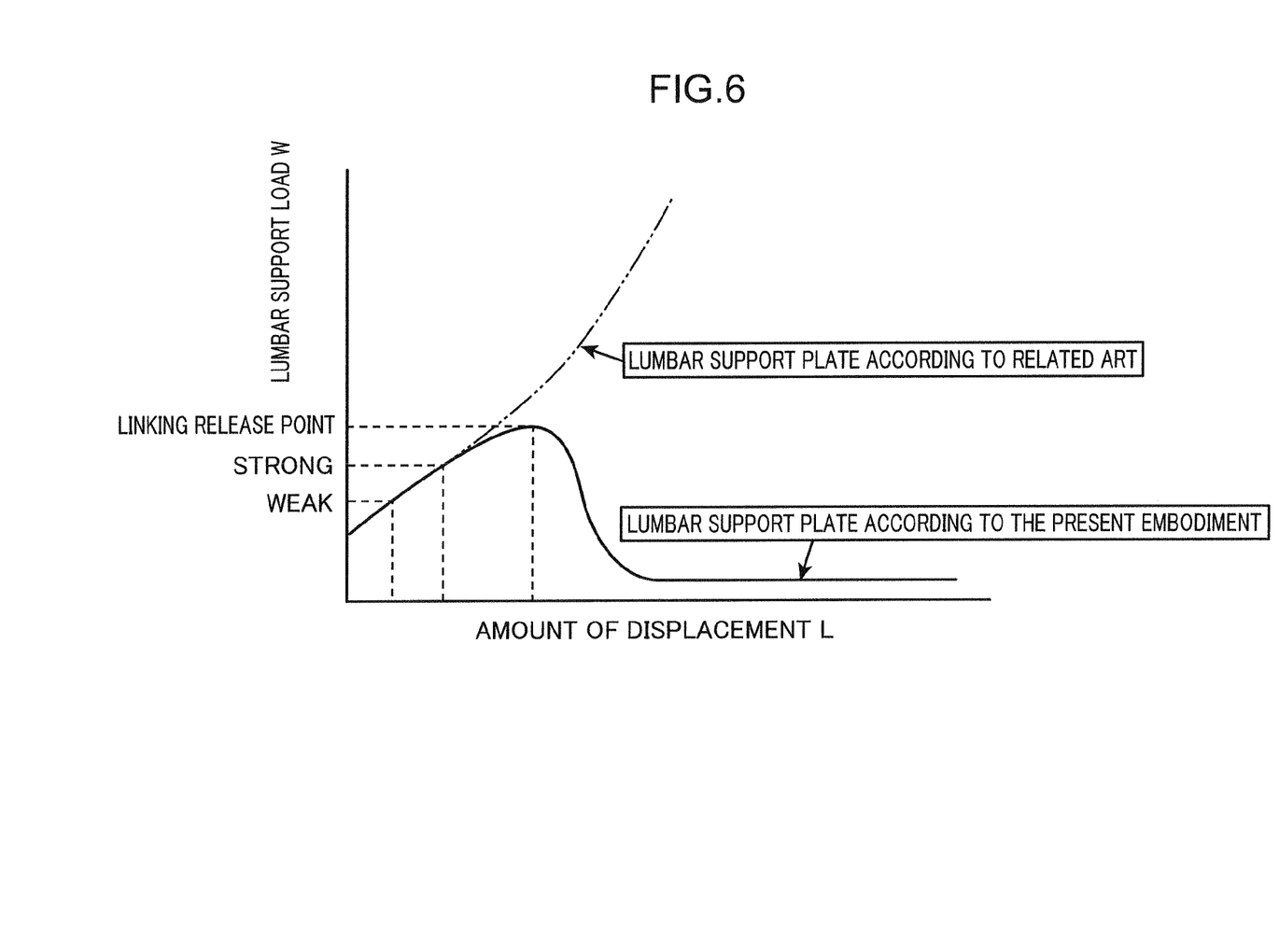
FIG. 6 is a graph comparing the lumbar supporting load and the amount of displacement of the lumbar support plate according to the related art and an embodiment of the present invention.

FIG. 6 is a graph which compares the lumbar support load W and the amount of displacement L of a lumber support plate 1 in the related art and the present embodiment.

In a state where the lumbar support plate 1 is set to "weak" or "strong", the relationship between the lumbar support load W and the amount of displacement L of the lumbar support plate 1 of the related art and the present embodiment are the same, as shown in FIG. 6.

When an occupant's weight equal to or exceeding a prescribed value is applied to the lumbar support plate 1 as a reaction to a rear impact, in a lumbar support plate 1 according to the related art, the lumbar support load W is high and the amount of displacement L is small, and therefore it is considered to be difficult to reliably receive the occupant's head on the headrest 21.

On the other hand, with the lumbar support plate 1 according to the present embodiment, since the lumbar support load W becomes low and the amount of displacement L becomes large upon passing the linking release point, then it is considered that the occupant's head can be reliably received by the headrest 21.

By devising the lumbar support device having a lumbar supporting function so as to also include a function of providing a neck injury countermeasure, the number of components is reduced, costs are also lowered, and increase in weight can be avoided.

Furthermore, in the lumbar support plate 1 of a torsion bar type, the fan-shaped gear 7 and the pin member 16 which are turned by the pinion 3 are virtually identical to those provided previously, and a plate spring (spring member) 25 and an undulating section (undulating member) 7a, 7b are simply added; hence, the structure is simple and increased costs can be avoided.

In the embodiment described above, as shown in FIG. 2, it is possible to provide a coil spring (restoring spring member) 27 which restores the lumbar support plate 1 to the initial position (a position where the other end portion 5b of the torsion bar 5 is fitted into the recess section 7a of the fan-shaped gear 7).

By means of this composition, when a load equal to or exceeding the prescribed value is not applied, then it is possible to automatically return the lumbar support plate 1 to the initial position. Furthermore, if the lumbar support plate 1 is adjusted to move forwards in a state where the occupant is resting against the seat back 19, then although the operating load is heavy, the operating load can be reduced by means of the coil spring 27.

The linking release mechanism according to the embodiment described above temporarily releases the link with the clutch mechanism 4, by causing the other end portion 5b of the torsion bar 5 to rise up onto the projecting section 7b of the fan-shaped gear 7.

On the other hand, the linking release mechanism can also be constituted by a brake drum 10 of the clutch mechanism 4 and a brake spring 11 which makes pressure contact with the inner wall of the brake drum 10.

In other words, the mechanism is set in such a manner that when a load equal to or greater than a prescribed value is applied to the lumbar support plate 1, the brake spring 11 slips against the inner wall of the brake drum 10 so as to allow rearward movement of the lumbar support plate 1.

More specifically, the load of the occupant's weight acting on the lumbar support plate 1 is normally about 200 N to 400 N, whereas when the load of the occupant's weight is about 600 N, then the brake spring 11 slips over the inner wall of the brake drum 10.

This composition simply involves setting the slip timing of the brake spring 11 with respect to the brake drum 10, and hence there is no requirement for additional components and costs are reduced.

In the embodiment described above, a cushion pad 28 which supports the upper part of an occupant's back is accommodated to the front side of the S spring 23 and the lumbar support plate 1 in the space between the left and right-hand side frames 20b, 20c in the back frame 20, as indicated partially by the dots in FIG. 4A. As shown in FIG. 1A, it is possible to form slits 29 extending in the vertical direction in both side portions of the cushion pad 28.

By this means, the upper half of the occupant's body sinks deeply into the seat back 19 together with the occupant's lumbar region, more rapidly, due to the cushion pad 28 between the slits 29.

The present invention provides a structure of a seat back with lumbar support for a vehicle, comprising:

a seat back (19);

a back frame (20), which is provided inside the seat back (19) and which supports a headrest (21); and a lumbar support plate (1) which is positioned inside a perimeter of the back frame (20) in a width direction of the vehicle and which is supported by the back frame (20) movably in a front/rear direction of the vehicle, the structure further comprising: a linking mechanism which normally holds the lumbar support plate (1) at a prescribed position, in the front/rear direction of the vehicle, with respect to the back frame (20); and a linking release mechanism which permits rearward movement of the lumbar support plate (1) that is in a state of being held at the prescribed position, when a load of a prescribed value or greater is applied to the lumbar support plate (1).

By means of the composition described above, a lumbar supporting function is obtained by the lumbar support plate (1) which is supported inside the seat back (19).

Furthermore, when an occupant load of a prescribed value or greater is applied to the lumbar support plate (1) as a reaction to a rear impact, then rearward movement of the lumbar support plate (1) is permitted by the linking release mechanism. By this means, the occupant's back sinks into the seat back (19) together with the lumbar support plate (1), and therefore the occupant's head is received reliably by the headrest (21) and a countermeasure to neck injury is obtained.

By devising the lumbar support device having a lumbar supporting function so as to also include a function of providing a neck injury countermeasure in this way, the number of components is reduced, costs are also lowered, and increase in weight can be avoided.

In one aspect of the present invention, the structure of a seat back with lumbar support for a vehicle further comprises:

a biasing member (5) which biases the lumbar support plate (1) in the direction of the prescribed position; and a handle shaft (2) which can perform a rotating operation and which is provided on one side frame (20b) of the back frame (20), wherein the linking mechanism has:

a clutch mechanism (4) which is capable of transmitting rotation of the handle shaft (2) to the output member (3); and an adjustment member which is capable of adjusting the front/rear position of the lumbar support plate (1) with respect to the back frame (20), in relation with the output member (3), and the linking release mechanism temporarily releases a state of linkage between the lumbar support plate (1) and the handle shaft (2) established by the linking mechanism (4), thereby permitting rearward movement of the lumbar support plate (1), when a load equal to or greater than a prescribed value is applied to the lumbar support plate (1).

In the composition described above, it is possible to adjust the position, in the front/rear direction of the vehicle, of the lumbar support plate (1) which is biased forwards in the seat back, via the clutch mechanism (4), by means of a rotational operation of the handle shaft (2). By this means, a lumbar supporting function is obtained in the lumbar support plate (1).

Furthermore, when an occupant load equal to or greater than a prescribed value is applied to the lumbar support plate (1) as a reaction to a rear impact, the linked state between the lumbar support plate (1) and the handle shaft (2) based on the linking mechanism (4) is temporarily released by the linking release mechanism, in such a manner that rearward movement of the lumbar support plate (1) is permitted. By this means, the occupant's back sinks into the seat back together with the lumbar support plate (1), and therefore the occupant's head is received reliably by the headrest (21) and a countermeasure to neck injury is obtained.

By devising the lumbar support device having a lumbar supporting function so as to also include a function of providing a neck injury countermeasure in this way, the number of components is reduced, costs are also lowered, and increase in weight can be avoided.

Moreover, in a further aspect of the present invention, in the structure of a seat back with lumbar support for a vehicle, the adjustment member includes a turning member (7) which turns in synchronization with rotation of the output member (3), and the position of the lumbar support plate (1), in the front/rear direction of the vehicle, with respect to the back frame (20) is adjustable by turning of the turning member (7), the biasing member includes a torsion bar (5) having one end portion and another end portion in a width direction of the seat back (19), the one end portion (5a) of the torsion bar (5) is linked to one side frame (20c) of the back frame (20), the other end portion (5b) of the torsion bar (5) is linked to the turning member (7) which turns as a result of a rotating operation of the output member (3), the linking release mechanism has:

a pin member (16) which fits the other end portion (5b) of the torsion bar (5) into the turning member (7) swingably and movably in the width direction of the seat back; and a spring member (25) which biases the other end portion (5b) of the torsion bar in a direction to make contact with a bottom surface of a recess section (7a) of an undulating section (7a, 7b) which is formed in the turning member (7), the other end portion (5b) of the torsion bar (5) is normally held inside the recess section (7a) of the undulating section, and the other end portion (5b) of the torsion bar (5) is moved in a width direction to be away from the recess section (7a) of the turning member (7) against an biasing force of the spring member (25), thereby allowing rearward movement of the lumbar support plate (1), when a load equal to or greater than a prescribed value is applied to the lumbar support plate (1).

In the composition described above, by adopting a composition in which the biasing member is formed by a torsion bar (5), the main constituent elements of the adjustment member are formed by a turning member (7), and the main constituent elements of the linking release mechanism are formed by a pin member (16), a spring member (25) and an undulating section (7a, 7b) formed in a turning member (7), then in a torsion bar of lumbar support plate (1), the turning member (7) which is turned by the output member (3) and the pin member (16) are virtually the same as existing components, and in practice, a spring member (25) and an undulating section (7a, 7b) are simply added to these, and hence the structure is simple and the cost is low.

In one aspect of the present invention, in the structure of a seat back with lumbar support for a vehicle, a restoring spring member (27) which biases the lumbar support plate (1) in a direction that restores the lumbar support plate to the prescribed position is further provided.

Furthermore, by providing a restoring spring member (27) which restores the lumbar support plate (1) to the initial position, it is possible to automatically restore the lumbar support plate (1) to the initial position, when a load equal to or greater than a prescribed value is not applied. Furthermore, if the lumbar support plate (1) is adjusted to move forwards in a state where the occupant is resting against the seat back, then although the operating load is heavy, the operating load can be reduced by means of the restoring spring (27).

In a further aspect of the present invention, in the structure of a seat back with lumbar support for a vehicle, the clutch mechanism (4) includes a brake drum (10) and a brake spring (11) which makes pressure contact with an inner wall of this brake drum (10), and the linking release mechanism is set such that, when a load equal to or greater than a prescribed value is applied to the lumbar support plate (1), the brake spring (11) slips against the inner wall of the brake drum (10) so as to allow rearward movement of the lumbar support plate (1).

In the composition described above, since the linking release mechanism is constituted by a brake drum (10) and a brake spring (11), and hence the invention simply involves setting the slip timing of the brake spring (11) with respect to the brake drum (10), and therefore additional components are not required and costs are low.

In one aspect of the present invention, in the structure of a seat back with lumbar support for a vehicle, a cushion pad (28) which supports the upper back (M) of a vehicle occupant is accommodated on a front side of the lumbar support plate (1) in a space between the back frame (20) and left and right-hand side frames (20b, 20c), and slits (29) extending in the vertical direction are formed in both side portions of the cushion pad (28).

By adopting a composition in which a cushion pad (28) that supports the upper back (M) of an occupant is accommodated to the front side of a lumbar support plate, in a space between a back frame (20) and left and right-hand side frames, and slits (29) extending in the vertical direction are formed in either side portion of the cushion pad (28), the occupant's upper body, together with the lumbar region, sinks deeply into the seat back (19) more rapidly.

In yet a further aspect of the present invention, in the structure of a seat back with lumbar support for a vehicle, the turning member (7) is formed by a fan-shaped gear which pivots about a pin member (16), a projecting section (7b) which projects inwards in the width direction of the seat back is formed in an outer perimeter edge portion of the fan-shaped gear (7) in a radial direction thereof, and a recess section (7a) which does not project inwards in the width direction is formed in an intermediate portion of the projecting section (7b).

In yet a further aspect of the present invention, in the structure of a seat back with lumbar support for a vehicle, the linking release mechanism is formed such that, when a load equal to or greater than a prescribed value is applied to the lumbar support plate (1), the other end portion (5b) of the torsion bar (5) deforms elastically inwards in the width direction, rotates about the pin member (16) so as to ride up onto the projecting section (7b) from the recess section (7a) of the fan-shaped gear (7), and moves along the projecting section (7b), thereby permitting rearward movement of the lumbar support plate (1).

This application is based on Japanese Patent Application Serial No. 2011-041248 filed in Japan Patent Office on Feb. 28, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A structure of a seat back with lumbar support for a vehicle, comprising:
    a seat back;
    a back frame, which is provided inside the seat back and which supports a headrest; and
    a lumbar support plate which is positioned inside a perimeter of the back frame in a width direction of the vehicle and which is supported by the back frame movably in a front/rear direction of the vehicle
    a linking mechanism which normally holds the lumbar support plate at a prescribed position, in the front/rear direction of the vehicle, with respect to the back frame; and
    a linking release mechanism which permits rearward movement of the lumbar support plate that is in a state of being held at the prescribed position, when a load of a prescribed value or greater is applied to the lumbar support plate;
    a biasing member that biases the lumbar support plate in the direction of the prescribed position,
    a handle shaft that can perform a rotating operation and that is provided on one side frame of the back frame,
    the linking mechanism including:
    a clutch mechanism that rotates an output member in response to a rotational force from the handle shaft and impedes transmitting rotation of the output member to the handle shaft, and
    an adjustment member that adjusts a front/rear position of the lumbar support plate with respect to the back frame in relation with rotation of the output member, wherein
    the adjustment member includes a turning member that turns in synchronization with rotation of the output member, an undulating section formed in the turning member, and the position of the lumbar support plate in the front/rear direction of the vehicle with respect to the back frame is adjustable by turning the turning member,
    the biasing member includes a torsion bar having one end portion and another end portion in a width direction of the seat back,
    the linking release mechanism has:
    a pin member that fits the other end portion of the torsion bar into the turning member swingably about an axis extending in a width direction of the seat back and movably in the width direction of the seat back,
    a spring member that biases the other end portion of the torsion bar in a direction to make contact with a bottom surface of a recess section of an undulating section,
    the other end portion of the torsion bar is normally held inside the recess section of the undulating section by a biasing force of the spring member, and
    the other end portion of the torsion bar is moved in a width direction of the seat back to be away from the recess section of the turning member against the biasing force of the spring member, thereby allowing a rearward movement of the lumbar support plate when a load equal to or greater than a prescribed value is applied to the lumbar support plate.

2. The structure of a seat back with lumbar support for a vehicle according to claim 1, wherein:

the linking release mechanism temporarily releases a state of linkage between the lumbar support plate and the handle shaft established by the linking mechanism, thereby permitting rearward movement of the lumbar support plate, when a load equal to or greater than a prescribed value is applied to the lumbar support plate.

3. The structure of a seat back with lumbar support for a vehicle according to claim 2, wherein the clutch mechanism includes a brake drum and a brake spring which makes pressure contact with an inner wall of this brake drum, and the linking release mechanism is set such that, when a load equal to or greater than a prescribed value is applied to the lumbar support plate, the brake spring slips against the inner wall of the brake drum so as to allow rearward movement of the lumbar support plate.

4. The structure of a seat back with lumbar support for a vehicle according to claim 2, wherein the one end portion of the torsion bar is linked to one side frame of the back frame, the other end portion of the torsion bar is linked to the turning member which turns as a result of a rotating operation of the output member.

5. The structure of a seat back with lumbar support for a vehicle according to claim 4, wherein the turning member is formed by a fan-shaped gear which pivots about a pin member, a projecting section which projects inwards in the width direction of the seat back is formed in an outer perimeter edge portion of the fan-shaped gear in a radial direction thereof, and a recess section which does not project inwards in the width direction is formed in an intermediate portion of the projecting section.

6. The structure of a seat back with lumbar support for a vehicle according to claim 1, further comprising a restoring spring member which biases the lumbar support plate in a direction that restores the lumbar support plate to the prescribed position.

7. The structure of a seat back with lumbar support for a vehicle according to claim 1, wherein a cushion pad which supports the upper back of a vehicle occupant is accommodated on a front side of the lumbar support plate in a space between the back frame and left and right-hand side frames, and slits extending in the vertical direction are formed in both side portions of the cushion pad.

8. The structure of a seat back with lumbar support for a vehicle according to claim 7, wherein the linking release mechanism is formed such that, when a load equal to or greater than a prescribed value is applied to the lumbar support plate, the other end portion of the torsion bar deforms elastically inwards in the width direction, rotates about the pin member so as to ride up onto the projecting section from the recess section of the fan-shaped gear, and moves along the projecting section, thereby permitting rearward movement of the lumbar support plate.

9. A structure of a seat back with lumbar support for a vehicle, comprising:

a seat back;

a back frame, which is provided inside the seat back and which supports a headrest; and a lumbar support plate which is positioned inside a perimeter of the back frame in a width direction of the vehicle and which is supported by the back frame movably in a front/rear direction of the vehicle;

a linking mechanism which normally holds the lumbar support plate at a prescribed position, in the front/rear direction of the vehicle, with respect to the back frame;

a linking release mechanism which permits rearward movement of the lumbar support plate that is in a state of being held at the prescribed position, when a load of a prescribed value or greater is applied to the lumbar support plate; and a cushion pad which supports the upper back of a vehicle occupant is accommodated on a front side of the lumbar support plate in a space between the back frame and left and right side frames, and slits extending in the vertical direction are formed in both side portions of the cushion pad.

10. The structure of a seat back with lumbar support for a vehicle according to claim 9, wherein the linking release mechanism is formed such that, when a load equal to or greater than a prescribed value is applied to the lumbar support plate, the other end portion of the torsion bar deforms elastically inwards in the width direction, rotates about the pin member so as to ride up onto the projecting section from the recess section of the fan-shaped gear, and moves along the projecting section, thereby permitting rearward movement of the lumbar support plate.

* * * * *